V. GUARDINO.
CUTTING MACHINE.
APPLICATION FILED MAY 13, 1921.

1,434,888.

Patented Nov. 7, 1922.
4 SHEETS—SHEET 3.

WITNESSES
Frederick Diehl

INVENTOR
V. GUARDINO
BY Munn & Co.
ATTORNEYS

V. GUARDINO.
CUTTING MACHINE.
APPLICATION FILED MAY 13, 1921.
1,434,888.
Patented Nov. 7, 1922.
4 SHEETS—SHEET 4.
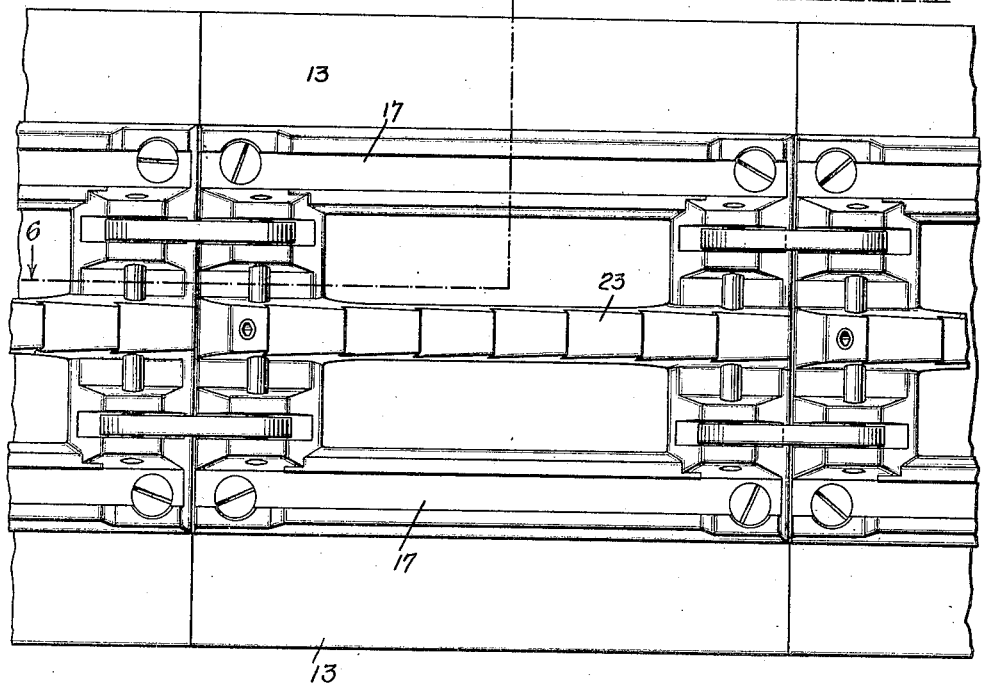
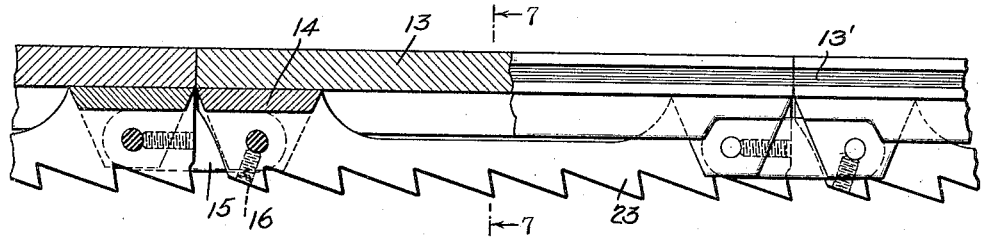
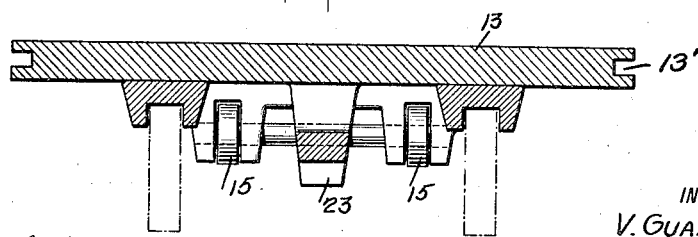
WITNESSES
Frederick Diehl.
INVENTOR
V. Guardino
BY
ATTORNEYS Patented Nov. 7, 1922.

1,434,888

UNITED STATES PATENT OFFICE.

VINCENZO GUARDINO, OF BROOKLYN, NEW YORK.

CUTTING MACHINE.

Application filed May 13, 1921. Serial No. 469,260.

*To all whom it may concern:*

Be it known that I, VINCENZO GUARDINO, a citizen of the United States, and resident of the city of New York, borough of Brooklyn, county of Kings, and State of New York, have invented a new and improved Cutting Machine, of which the following is a full, clear, and exact description.

My invention relates to a cutting machine, and aims to provide a device of this nature more particularly adapted for use in connection with the cutting of blocks of frozen cream into slices.

It is well appreciated in connection with cutting devices heretofore provided for this purpose that the results achieved, have been, to say the least, unsatisfactory. Thus the slices have been of unequal thickness, and an operator has been incapable of cutting more than a relatively small number of blocks within a given period.

Further, cutting machines heretofore provided have made it necessary that the blocks be handled quite a number of times by the operator, thus increasing danger of a contamination, due to this handling.

Thus it is an object of my invention primarily to provide a cutting machine which shall be extremely simple in construction and by means of which each slice cut from the block will be equal in size to every other slice cut therefrom.

A further object of my invention is the construction of a device of the nature stated by means of which a great number of blocks may be cut within a given period.

Still another object of this invention is the construction of a cutting machine by means of which the handling of the frozen blocks of cream will be reduced to a minimum.

Still further objects of my invention will appear in the annexed specification taken in connection with the drawings, which latter present one practical embodiment thereof, and in which:

Figure 5 is a fragmentary enlarged bottom plan view of a portion of the carriers which support the blocks.

Figure 6 is a sectional view taken along the line 6—6 of Figure 5 and in the direction of the arrows shown in Figure 5, and Figure 7 is a transverse sectional view taken along the line 7—7 and in the direction of the arrows indicated in Figure 6.

Figure 1:
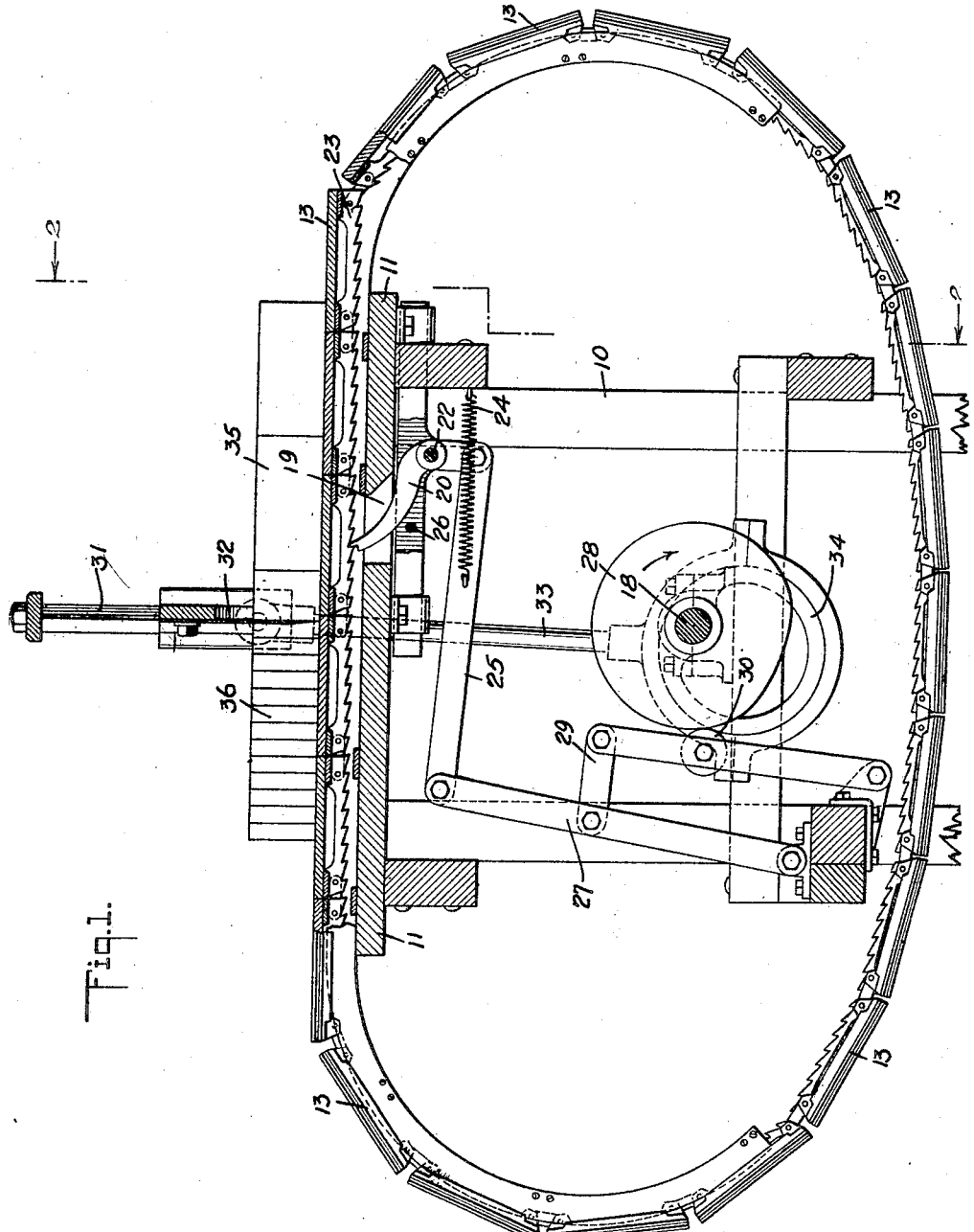
Figure 1 is a sectional side view of the entire machine taken along the line 1—1 and in the direction of the arrows indicated in Figure 2.
Figure 2:
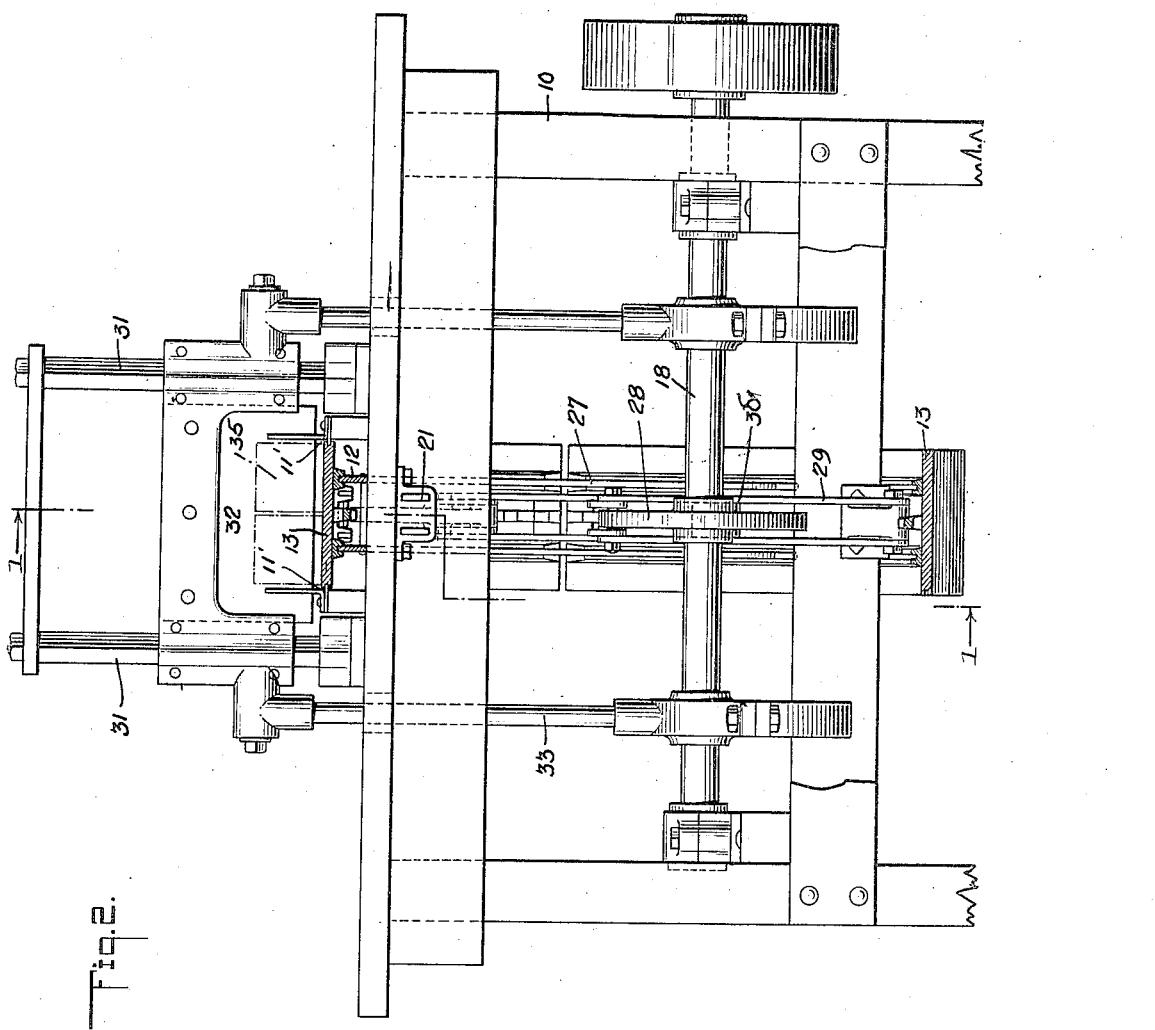
Figure 2 is a partly sectional end view taken along the line 2—2 and in the direction of the arrows indicated in Figure 1 and showing two columns of material to be cut arranged side by side upon the conveyor.
Figure 3:
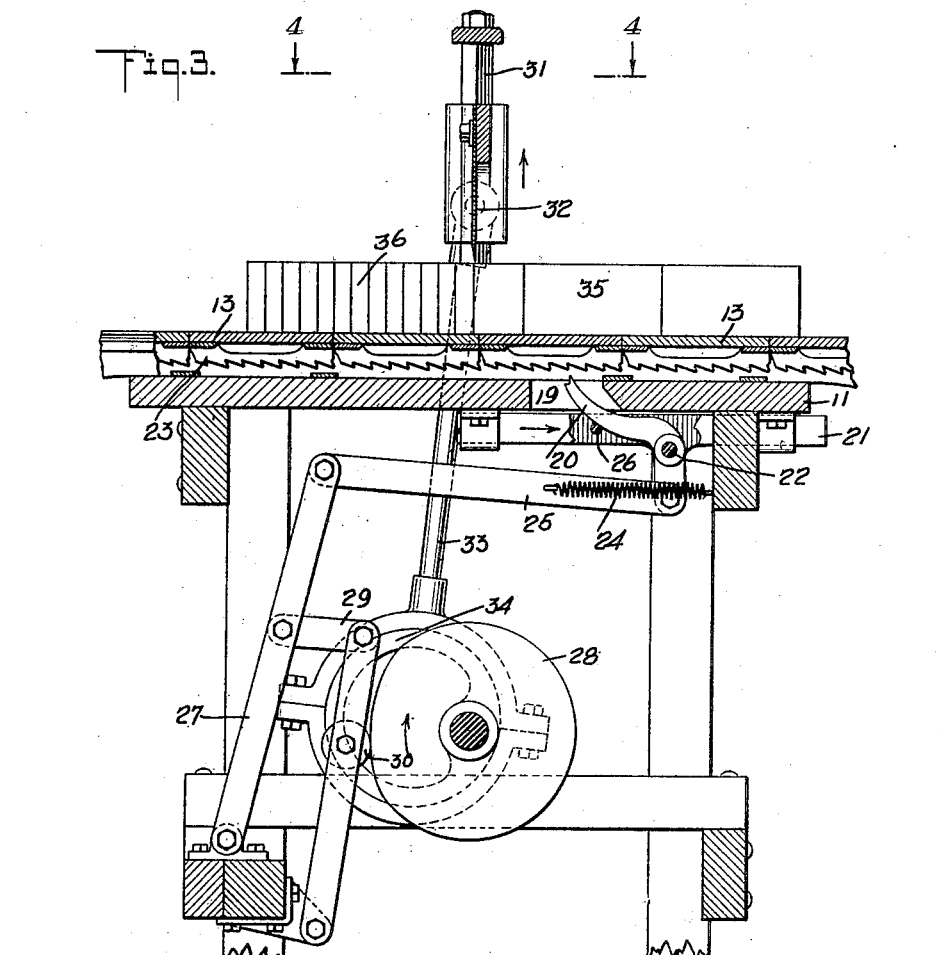
Figure 3 is an enlarged sectional view of certain details of the operating mechanism shown in Figure 1.

Referring now more particularly to Figures 1 to 3 it will be seen that the reference numeral 10 indicates the stand of the machine which may be of any desirable construction, and which serves to support a table 11 secured to its upper end, said table supporting the conveyor and cutting mechanism.

Referring especially to the conveyor mechanism it will be seen that the same comprises a pair of rails, 12 extending longitudinal of and secured to the upper face of the table 11. Also these rails are preferably extended beyond the side edges of the table, and have their outer ends curved so as to project downwardly and inwardly, towards each other.

Slidably mounted upon the rails 12 is an endless conveyor, and with a view of indicating the specific construction of the same, reference is had to Figures 5 to 7. It will be seen in these views that the conveyor includes a plurality of platforms 13 having lugs 14 extending from their lower faces, these lugs having their outer edges undercut so that the platforms 13 may be disposed at angles to each other as in Figure 1, in passing around the ends of the track. Extending between the lugs of adjacent platforms 13 are links 15 which have their ends pivotally secured one to each of these lugs, suitable means such as screws 16 co-operating with the lugs and links for taking up any play between these parts. Further, suitable members are affixed to the under side of each of the platforms 13, which members present grooves 17 into which the tracks 12 may project, it being noted in this connection that the grooves 17 of adjacent platforms are aligned so as to form a continuous channel permitting of the platforms being properly guided while moving along the tracks. It will also be noted that the table 11 is provided with guide elements 11' which latter are adapted to co-operate with the side edges of each of the platforms 13 and are preferably formed with an extended portion as in Figure 2 which projects into grooves 13 formed in the longitudinal side edges of each of the platforms thus obviously preventing any danger of the conveyor accidentally jumping the tracks.

Thus a conveyor is provided upon which the blocks to be cut may be disposed, and with a view of automatically moving this conveyor I preferably utilize a feeding mechanism operated by means of a rotatable shaft 18 preferably supported by the stand 10. It will be seen reference being had to Figures 1 to 3, that the table 11 is formed with a cutout portion 19 and a pawl 20 has its end extending through this cutout portion. A carriage for the pawl 20 is provided by utilizing a pair of bars 21 slidably secured to the under face of the table 11, and at a point below the cutout portion 19. These bars support the shaft 22 upon which the pawl 20 is rockingly mounted, thus supporting the said pawl between the bars 21.

As has been most clearly shown in Figures 5 to 7, a ratchet member 23 is also secured to the under face of each of the platforms, and is preferably centrally arranged between the grooves 17. This ratchet is capable of being engaged by the pawl 20, but it is to be noted that the outer end of said pawl is normally swung out of engagement with the said ratchet and the carriage constituted by the bars 21 is also moved to its extreme outward position by virtue of a spring 24 which has one of its ends secured to a fixed portion of the frame or stand 10, its opposite end connecting with a bar 25 having one of its ends pivotally secured to the inner end of the pawl 20.

Thus upon a pull being exerted upon the bar 25 the pawl 20 will primarily be swung into engagement with the ratchet 23. A further pull upon the bar 25 will result in a movement of the carriage being effected, and a consequential feeding of the conveyer for a predetermined distance. A release of the bar 25 will result in a pawl 20 primarily swinging out of engagement with the ratchet 23, and to a point at which it will bear against the stop pin 26 extending between the bars 21, and subsequent to this a retraction of the carriage will be effected by means of the spring 24 permitting of a repetition of the entire cycle of operation.

To now provide means which will serve to effect the movement of the bar 25, which is to be accomplished, a secondary bar 27 is utilized, this latter bar having one of its ends secured to a fixed portion of the stand 10, its opposite end being pivotally secured to the end of the bar 25. A cam 28 is mounted upon the shaft 18 and fixedly secured thereto, and to multiply the power produced by this cam and to transmit the same to the bar 27 I preferably employ a link motion consisting of a pair of links 29, the inner ends of said links being pivotally secured one to the other, the outer ends thereof being pivotally secured to the bar 27 and fixed portion of the frame 10 respectively.

A roller 30 is also preferably attached to the link, having one of its ends associated with the frame, and this roller contacts with the face of the cam 28. Thus, as has been illustrated in Figure 1, the body of the cam will exert through the links 29 and bars 27 and 25, a pulling action upon the pawl 20 thus feeding the conveyor formed by the series of inter-connected platforms, one step. Upon the heel of the cam 28 engaging the roller 30, as in Figure 3, it will be seen that the aforedescribed operation will release the pawl and permit a return of the carriage.

Figure 4:
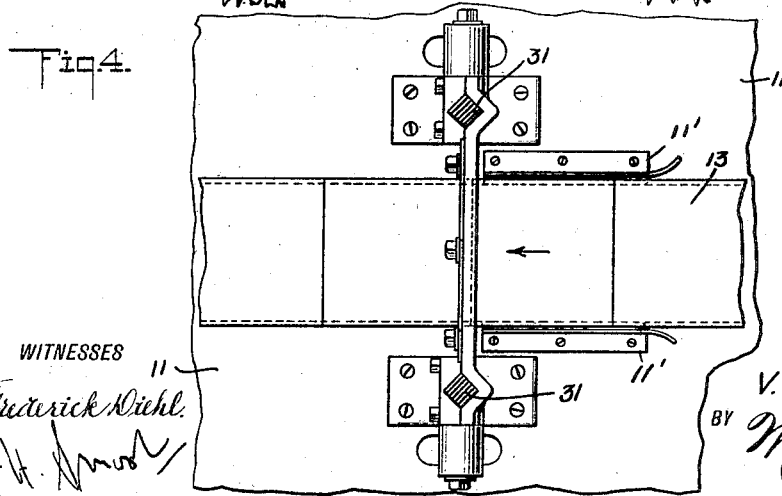
Figure 4 is a sectional plan view thereof taken along the line 4—4 of Figure 3.

Now with respect to the cutting mechanism, attention is invited to Figures 2, 3 and 4. In these views it will be seen that a guillotine is fixed to the upper face of the table 11, and this guillotine consists of side members 31 upon which a blade 32 is slidably mounted. Also rods 33 have their upper ends pivotally attached to the carriage of the blade 32, and their opposite ends are connected to cams 34 attached to the shaft 18. Thus upon the said shaft being rotated it will be appreciated that the blade of the guillotine will be reciprocated, and obviously one descent of the blade will be effected each time the conveyor is moved forward one step.

Thus it will be seen that the blocks 35 to be subdivided may be placed by an operator upon the platforms in advance of the guillotine. An operation of the machine will result in the said blocks being moved under the blade 32 of the guillotine, this movement being intermittent. By virtue of the disposition of the cams, the blade 32 will descend, while the pawl is moving rearwardly, and thus the slices 36 desired will be produced, it being noted that by virtue of the fact that the upper portion of the conveyor is horizontally disposed, that the operator will have ample time to arrange a series of blocks well in advance of the blade and to remove the slices from the rear thereof thus permitting of a continuous operation.

It will also be appreciated that the movement of the conveyor produced by the actuation of the pawl 20 will be intermittent, and thus the conveyor will be stationary during each descent of the blade 32, it being also noted that by virtue of the mounting of the pawl that no possibility of a rearward drive upon the conveyor during the outward movement of the carriage will exist.

Thus all of the objects set forth in the preamble of this specification will have been accomplished, and it will be seen that numerous modifications of structure might readily be resorted to without in the least departing from the spirit of my invention, which I claim as:

1. A cutting machine including a stand, tracks secured to said stand, an endless conveyor mounted upon said tracks, said conveyor comprising a series of interconnected platforms, a ratchet portion secured to the underside of each of said platforms, a carriage slidably secured to said stand, a pawl rockingly mounted upon said carriage, a bar connected to the inner end of said pawl, and a contraction spring having one of its ends secured to said bar, the opposite end thereof being secured to said stand, and means for intermittently exerting a pull upon said bar.

2. A cutting machine including a stand, tracks secured to said stand, an endless conveyor mounted upon said tracks, said conveyor comprising a series of interconnected platforms, a ratchet portion secured to the underside of each of said platforms, a pawl movably secured to said stand, a carriage slidably secured to said stand, a pawl rockingly mounted upon said carriage, a bar connected to the inner end of said pawl, a contraction spring having one of its ends secured to said bar, the opposite end thereof being secured to said stand, means for intermittently exerting a pull upon said bar, and a stop pin secured to said carriage and adapted to act as a limiting means for the movement imparted to said pawl by said spring when the pull upon said bar is released.

3. A cutting machine including a stand, an endless conveyor secured to said stand, a cutting blade movably attached to said stand and arranged upon said conveyor, means for reciprocating said blade, a ratchet secured to the underside of said conveyor, a plurality of bars slidably secured to the under face of the upper portion of said frame, a pawl rockingly carried between said bars, and having its upper end engaging said ratchet, a bar connected to the inner end of said pawl, a spring co-operating with said bar to normally exert a release of said pawl from said ratchet, and a retraction of the carriage formed by said slidable bars, and means for exerting an intermittent pull upon said bar.

4. A cutting machine including a stand, an endless conveyor secured to said stand, a cutting blade movably attached to said stand and arranged upon said conveyor, means for reciprocating said blade, a ratchet secured to the underside of said conveyor, a plurality of bars slidably secured to the under face of the upper portion of said frame, a pawl rockingly carried between said bars, and having its upper end engaging said ratchet, a bar connected to the inner end of said pawl, a spring co-operating with said bar to normally exert a release of said pawl from said slidable bars, a secondary bar connected to said first named bar, a shaft rotatably carried by said frame, a cam mounted upon said shaft and means connecting said last named bar to said cam.

5. A cutting machine including a stand, an endless conveyor secured to said stand, a cutting blade movably attached to said stand and arranged upon said conveyor, means for reciprocating said blade, a ratchet secured to the under side of said conveyor, a plurality of bars slidably secured to the under face of the upper portion of said frame, a pawl rockingly carried between said bars and having its upper end engaging said ratchet, a bar connected to the inner end of said pawl, a spring co-operating with said bar to normally exert a release of said pawl from said slidable bars, a secondary bar connected to said first named bar, a shaft rotatably carried by said frame, a cam mounted upon said shaft, a pair of links connected to each other and to said last named bar, and stand respectively, and a roller carried by one of said links and engaged by said cam whereby to effect a movement of said bars upon said shaft being rotated.

VINCENZO GUARDINO.